(12) United States Patent
Kuroiwa et al.

(10) Patent No.: US 6,202,102 B1
(45) Date of Patent: Mar. 13, 2001

(54) STATE MACHINE AND COMMUNICATION TERMINAL

(75) Inventors: Koichi Kuroiwa; Shoji Taniguchi, both of Kawasaki (JP)

(73) Assignee: Fujitsu Limited, Kawaski (JP)

( * ) Notice: Subject to any disclaimer, the term of this patent is extended or adjusted under 35 U.S.C. 154(b) by 0 days.

(21) Appl. No.: 09/399,818

(22) Filed: Sep. 21, 1999

Related U.S. Application Data

(62) Division of application No. 09/071,824, filed on May 4, 1998, now Pat. No. 5,983,287, which is a division of application No. 08/975,071, filed on Nov. 20, 1997, now Pat. No. 5,778,257, which is a continuation of application No. 08/494,087, filed on Jun. 23, 1995, now abandoned.

(30) Foreign Application Priority Data

Sep. 20, 1994 (JP) .................................. 6-224655

(51) Int. Cl.$^7$ .................................................. G06F 13/14
(52) U.S. Cl. ............................................. 710/14; 709/203
(58) Field of Search .............................. 710/52, 48, 14, 710/25; 709/203

(56) References Cited

U.S. PATENT DOCUMENTS

| | | | |
|---|---|---|---|
| 4,433,412 | 2/1984 | Best et al. ............................ | 371/25.1 |
| 4,604,744 | 8/1986 | Littlebury et al. ..................... | 371/20 |
| 4,876,640 | 10/1989 | Shankar et al. ....................... | 364/200 |
| 4,991,176 | 2/1991 | Dahbura et al. ....................... | 371/27 |
| 5,097,151 | 3/1992 | Eerenstein et al. .................. | 307/465 |
| 5,132,974 | 7/1992 | Rosales ................................ | 371/22.3 |
| 5,142,247 | 8/1992 | Lada, Jr. et al. ....................... | 331/14 |
| 5,198,758 | 3/1993 | Iknaian et al. ........................ | 324/158 |
| 5,221,866 | 6/1993 | Takatsu ................................ | 307/465 |
| 5,228,040 | 7/1993 | Agrawal et al. ....................... | 371/22.1 |
| 5,228,045 | 7/1993 | Chiles ................................. | 371/22.3 |
| 5,276,857 | 1/1994 | Hartung et al. ....................... | 395/550 |
| 5,333,300 | 7/1994 | Fandrich ............................... | 395/550 |
| 5,339,320 | 8/1994 | Fandrich et al. ..................... | 371/22.2 |
| 5,349,544 | 9/1994 | Wright et al. ......................... | 708/1 |
| 5,359,636 | * 10/1994 | Aoyama ................................ | 377/73 |
| 5,369,647 | 11/1994 | Kreifels et al. ..................... | 371/25.1 |
| 5,394,347 | 2/1995 | Kita et al. ........................... | 364/578 |
| 5,402,381 | * 3/1995 | Sonobe et al. ....................... | 365/218 |
| 5,453,992 | 9/1995 | Whetsel ............................... | 371/22.3 |

(List continued on next page.)

OTHER PUBLICATIONS

Katoozi, M.; Soma, M.; "Built–in Test of CMOS State Machines with Realistic Faults"; IEEE Journal of solid–State Circuits; pp. 482–489.

*Primary Examiner*—Thomas C. Lee
*Assistant Examiner*—Abdelmoniem Elamin
(74) *Attorney, Agent, or Firm*—Arent Fox Kintner Plotkin & Kahn, PLLC

(57) ABSTRACT

A state machine that can be tested easily is disclosed. A state machine has a latch for storing data representing an intended state and a state control unit for producing data representing a subsequent state according to an intended state provided by the latch and a detection signal, and makes state transitions consecutively. The state machine comprises a state data input unit for inputting data representing an intended state directly from an external unit, a selector for selecting either data provided by the state control unit or data provided by the state data input unit so as to supply selected data as data representing a subsequent state to the latch, and a control data input unit for externally inputting control data for use in controlling the selection performed by the selector. After data representing an intended state is fed to the state data input unit, when control data requesting the selector to select data provided by the state data input unit and to send the data to the latch is input via the control data input unit, the latch latches data representing an intended state synchronously with a clock and thus retains the intended state.

2 Claims, 20 Drawing Sheets

U.S. PATENT DOCUMENTS

| | | | |
|---|---|---|---|
| 5,455,930 | 10/1995 | Larson | 395/550 |
| 5,542,034 | 7/1996 | Petler | 395/500 |
| 5,584,033 * | 12/1996 | Barrett et al. | 710/105 |
| 5,612,979 * | 3/1997 | Takano | 375/354 |
| 5,623,499 | 4/1997 | Ko et al. | 371/22.1 |
| 5,742,650 | 4/1998 | Nuckolls et al. | 375/376 |
| 5,774,719 * | 6/1998 | Bowen | 709/300 |
| 5,862,131 | 6/1999 | Petty et al. | 370/362 |

* cited by examiner

STATE TRANSITION REGISTER : | D7 | D6 | D5 | D4 | D3 | D2 | D1 | D0 |

| BIT NUMBER | DESCRIPTION |
|---|---|
| D7 | STATE TRANSITION MODE BIT<br>0 : NORMAL OPERATION MODE<br>1 : STATE TRANSITION SPECIFICATION MODE |
| D6 | STATE TRANSITION RETENTION MODE BIT<br>0 : NORMAL OPERATION MODE<br>1 : STATE RETENTION MODE |
| D5~D0 | STATE TRANSITION CODE BITS<br>000000 : STATE a<br>000001 : STATE b<br>000010 : STATE c<br>000011 : STATE d<br>000100 : STATE e<br>000101 : STATE f |

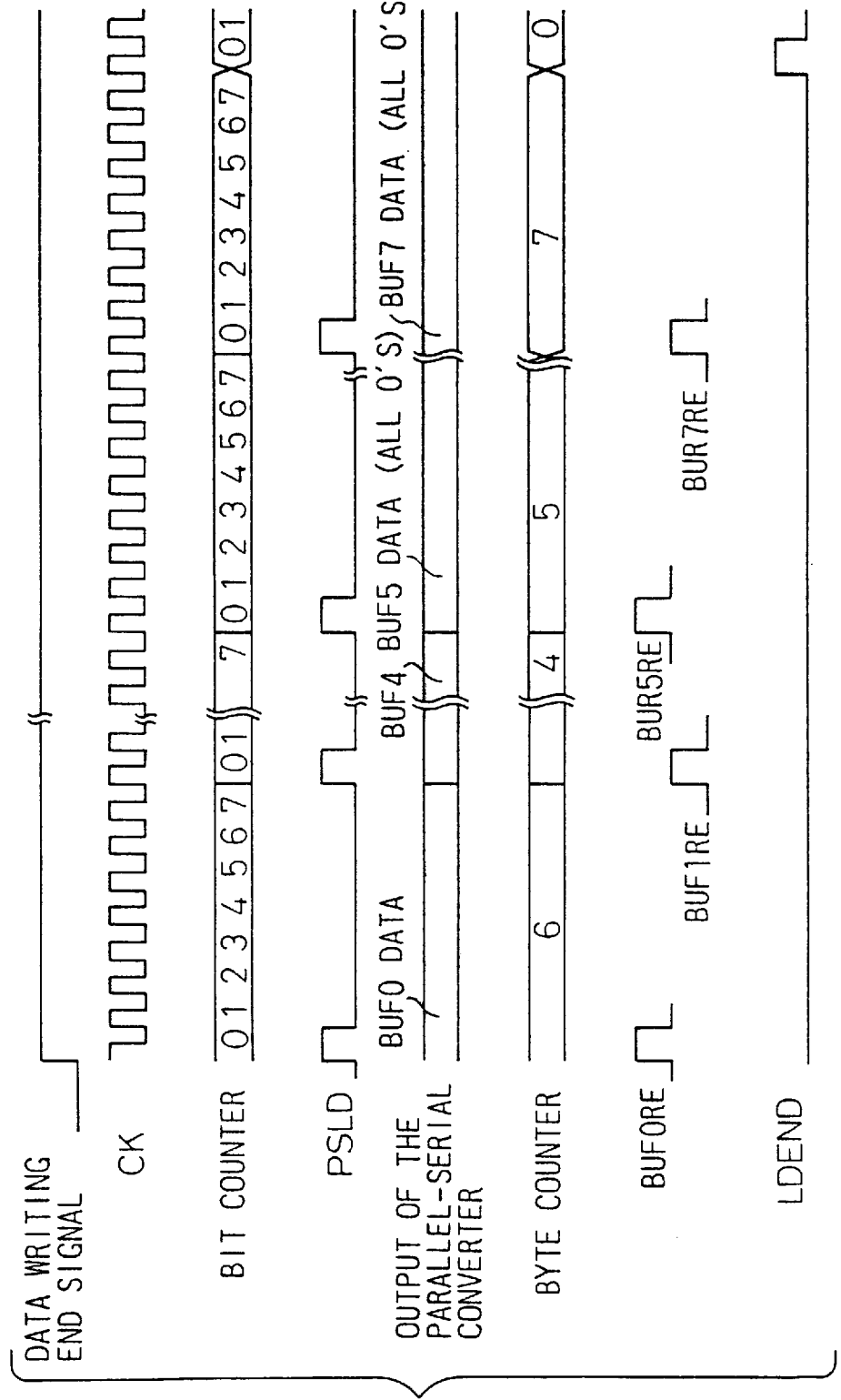

STATE MACHINE AND COMMUNICATION TERMINAL

This application is a divisional application of Ser. No. 09/071,824 filed May 4, 1998 now U.S. Pat. No. 5,983,287 which is a divisional application of Ser. No. 08/975,071 filed Nov. 20, 1997 now U.S. Pat. No. 5,778,251 issued Jul. 7, 1998 which is a continuation of Ser. No. 08/494,087 filed Jun. 23, 1995 now abandoned.

BACKGROUND OF THE INVENTION

1. Field of the Invention

The present invention relates to a state transition circuit that changes states consecutively, and synchronously with a signal, and varies the contents of control processes according to a state at every time instant; that is, a so-called state machine, and to a communication terminal that uses the state machine to control communication.

2. Description of the Related Art

It is a matter of common practice to construct a circuit responsible for various kinds of control by combining gates and latches. The circuit is used for control systems that are not as complex as a microcomputer and that require instantaneous control. However, the circuit may be used in combination with a microcomputer. Specifically, for example, overall processing is assigned to a CPU in a microcomputer and some control is assigned to the state transition circuit.

A control method can be such that state transitions are made consecutively with the progress of control. Even if the same signal is fed, the contents of control processes vary according to a state at every time instant. The method in which state transitions are made consecutively with the progress of control is referred to as a state transition method. The foregoing control circuit that is composed of gates and latches and makes state transitions is referred to as a state machine.

In recent years, digital mobile communications have become popular. In a terminal for mobile communication, a state machine is used to control transmission and reception. Sequences directly related to transmission and reception are required to be processed quickly. When such sequences are assigned to a microcomputer, the microcomputer must monitor the states of a receiver and a transmitter all the time. This results in the degraded performance of the microcomputer. From this viewpoint, the sequences are usually assigned to the state machine so that the microcomputer can concentrate on other processing.

A conventional state machine includes a state latch for storing data representing a state at a certain time instant, and a state control circuit for producing data representing a subsequent state according to the state at a certain time instant and a detection signal. When predetermined conditions are met in a certain state, the state machine makes a transition to another state. When other predetermined conditions are met in current state, the state machine makes a transition to yet another state. Thus, the state machine makes a transition to any given state.

Recently, there is an increasing demand for portable telephones. Above all, a cellular system is employed in the field of digital portable telephone service. A radio-frequency band usable within a cell that is a geographical region defined under the cellular concept is divided into narrower frequency bands. A portable terminal uses one of the frequency bands to transfer control data or voice and information. The data path through which data is transferred includes a searching BCCH channel, control channel, and a communication channel. The frequency employed differs from channel to channel. For realizing continuous communication while moving, a base station that is communicating may be switched to another one. Thus, frequencies are switched.

In vehicle-mounted mobile phone systems, digitization is in progress and a time division multiple access (hereinafter TDMA) method has been adopted widely. According to the TDMA method, data transfer is achieved in units of block data that is data having a length of a given number of bytes. In general, block data to be handled at a lower level (for example, in a physical layer) of transfer described in a protocol includes control data, concerning a high layer of transfer described in a protocol, and a message. The data length of data in a high layer of transfer described in a protocol may be smaller than that of block data such as the K-th block data. In this case, a general protocol stipulates that if no effective data is handled in a high layer of transfer described in the protocol, block data should be padded with a specific fill pattern (for example, 0s).

A terminal included in a vehicle-mounted mobile phone system comprises a state machine, a receiver, a transmitter, a phase-locked loop (hereinafter PLL), and a computer. Among the components, each of the state machine, receiver, transmitter, and PLL is usually realized with a single LSI. Alternatively, the state machine, receiver, and transmitter may be realized with a single LSI.

For testing an LSI that realizes a state machine or an LSI that realizes the state machine, receiver, and transmitter, the state machine that can assume a plurality of states need not be tested in all the states thereof. Whether or not the state machine operates normally can be checked merely by testing it in a specific state. However, when it is required to test the state machine in a certain state, the state machine must be reset to the initial state, and changed from one state to another until it is placed in the test state. In other words, the state machine cannot be changed to a desired state until it satisfies the conditions for all preceding states. When a state machine that makes complex state transitions is concerned, it takes much time to place the state machine in a desired state. This leads to degradation in the use efficiency of a tester and an increase in test cost.

When given conditions are met, a state machine makes a transition to another state. As far as testing is concerned, it may be required to retain the state machine in a certain state. For retaining a state machine in a conventional terminal in a certain state, setting performed by an internal logic circuit or designated at an external unit is controlled so that the conditions for another state will not be met. However, this control is complex. It is therefore demanded that a certain state can be retained effortlessly.

In the foregoing communication terminal, a microcomputer is designed to determine whether a PLL is locked to a frequency during frequency setting or to mask a state machine until a frequency is locked as a result of frequency switching. This means that a microcomputer must bear a heavy load, leading to a lower processing speed. When a microcomputer offering superb processing ability is used in order to solve this problem, cost increases.

Likewise, in a conventional transmitter for transmitting block data, a microcomputer is designed to write fill pattern in a data register. This also means that a microcomputer must bear a heavy load. The foregoing problems ensue.

SUMMARY OF THE INVENTION

The first object of the present invention is to realize a state machine that can be tested easily. The second object of the present invention is to reduce the load borne by a microcomputer in a communication terminal.

According to the first aspect of the present invention, there is provided a state transition control circuit that includes a latch means for storing data representing an intended state, and a state control means for producing data representing a subsequent state according to an intended state provided by the latch means and a detection signal. In the state transition control circuit, when the latch means latches data provided by the state control means synchronously with a clock, state transitions are made consecutively. The state transition control circuit further comprises a state data input means for inputting data representing an intended state, a selecting means for selecting either data provided by the state control means or data provided by the state data input means so as to supply the selected data as data representing a subsequent state to the latch means, and a control data input means for inputting control data, which is used to control selection performed by the selecting means, from an external unit.

The state data input means and control data input means are directly and externally writable registers or external ports.

Also included are a state transition stopping means for stopping state transition and retaining a state at that time instant, and a transition stoppage specification data input means for specifying in the control data input means whether normal operation should be performed or the state transition stopping means should be actuated to stop state transitions.

The state transition stopping means is a circuit for substantially stopping input of a clock to the latch means.

The state transition stopping means and transition stoppage specification data input means may be independently incorporated in a conventional state machine.

In the state transition control circuit according to the first aspect of the present invention, data representing an intended state is fed to the state data input means. Control data for use in allowing the selecting means to supply data provided by the state data input means to the latch means is supplied from the control data input means. The latch means then latches the data representing the intended state synchronously with a clock, thus retaining the intended state. When the state transition stopping means is designed to stop state transitions so as to retain a state at that time instant according to the specification made at the transition stop specification data input means, the state at that time instant can be retained.

According to the second aspect of the present invention, there is provided a communication terminal that comprises a PLL for producing a clock whose frequency can be switched to another at any time, a receiver for receiving a communication signal synchronously with the clock provided by the PLL, a transmitter for transmitting a communication signal synchronously with the clock provided by the PLL, a state machine responsible for control related to the receiver and transmitter, and a microcomputer responsible for the control of the whole terminal except that assigned to the state machine. The PLL provides the state machine with a lock detection signal indicating that the PLL is locked to an intended frequency. The state machine starts subsequent control automatically in response to the lock detection signal.

The state machine has a lock ready standby state, so that when the microcomputer instructs the PLL to lock into an intended frequency, the state machine can enter a standby state and wait until the PLL is locked to an intended frequency under. When receiving a lock detection signal in the lock ready standby state, the state machine makes a transition to a subsequent control state.

The state machine makes a transition to the lock ready standby state responsively to issuance of a frequency channel activation request or frequency channel switching request by the microcomputer.

In the communication terminal according to the second aspect of the present invention, the PLL provides the state machine with a lock detection signal indicating that the PLL is locked to an intended frequency. The state machine starts subsequent control automatically in response to the lock detection signal. The microcomputer therefore need not determine whether the PLL is locked to a frequency during frequency setting and masks the state machine until the PLL is locked to a frequency as a result of frequency switching. This results in a lightened load borne by a microcomputer.

According to the third aspect of the present invention, there is provided a transmitter that transmits block data having a fixed data length and pads a blank area in block data with a given fill pattern. The transmitter comprises a data register for temporarily storing transmission data, and a parallel-serial converter for converting the transmission data stored in the data register into serial data. The transmitter further comprises a fill pattern generator for producing a fill pattern, and a writing data selecting circuit that when transmission data is available, supplies the transmission data to the data register, and that when a blank area in block data succeeds the transmission data, supplied a fill pattern provided by the fill pattern generator to the data register.

In the transmitter according to the third aspect of the present invention, when transmission data is available, the writing data selecting circuit supplies the transmission data to the data register. When a blank area in block data succeeds the transmission data, the writing data selecting circuit supplies a fill pattern provided by the fill pattern generator to the data register. The microcomputer is therefore released from the work of writing a fill pattern. Thus, the load the microcomputer must bear is lightened.

BRIEF DESCRIPTION OF THE DRAWINGS

The above object and features of the present invention will be more clearly understood from the description set forth below with reference to the accompanying drawings, wherein:

FIG. 20 is a timing chart describing transmission to be performed in the third embodiment.

DESCRIPTION OF THE PREFERRED EMBODIMENTS

Prior to preferred embodiments of the present invention, a conventional state machine and a communication terminal will be described briefly so that the features of the present invention can be understood more clearly.

The present invention will be described by taking a vehicle-mounted digital mobile phone system as an example. However, the present invention is not restricted to this example.

Figure 1:
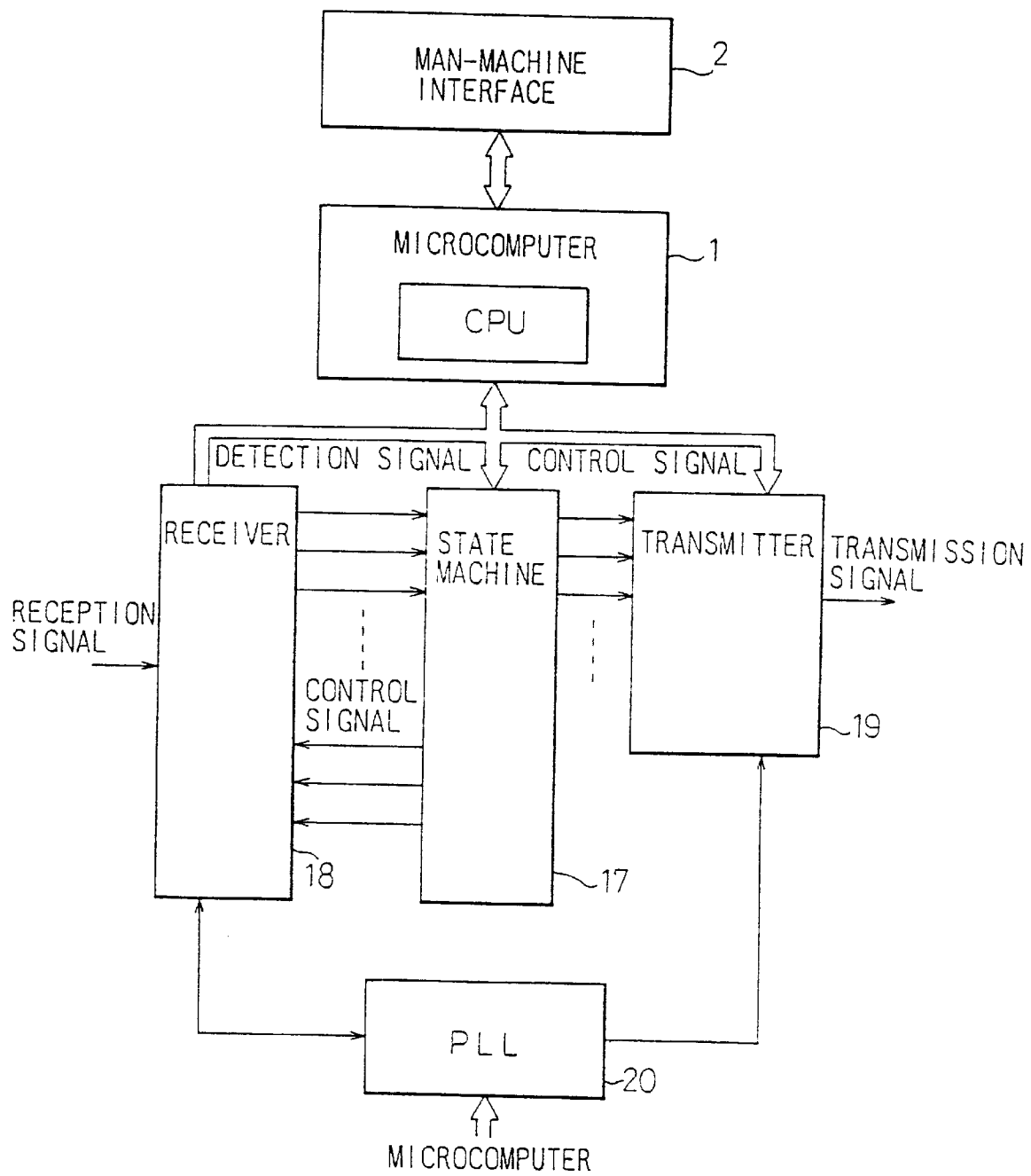
FIG. 1 shows the configuration of a conventional communication terminal.

FIG. 1 shows an example of the configuration of a vehicle-mounted digital mobile phone system.

In FIG. 1, reference numeral 1 denotes a microcomputer responsible for control of the whole system. The microcomputer 1 includes a central processing unit (hereinafter CPU). 2 denotes a man-machine interface for processing various jobs to interface with a user of the system. 17 denotes a state machine. 18 denotes a receiver. 19 denotes a transmitter for converting transmission data having a length of a plurality of bits and being written by the microcomputer 1 into serial data and for transmitting the serial data. 20 denotes a PLL for generating a clock necessary for communication. In the vehicle-mounted mobile phone system, a frequency band used for communication changes from one band to another uninterruptedly. The PLL therefore generates a clock whose frequency stays in a frequency band used for communication. Sequences directly related to transmission and reception are required to be processed quickly. These sequences are therefore processed by the state machine 17. Commonly, the microcomputer concentrates on other processing.

Figure 2:
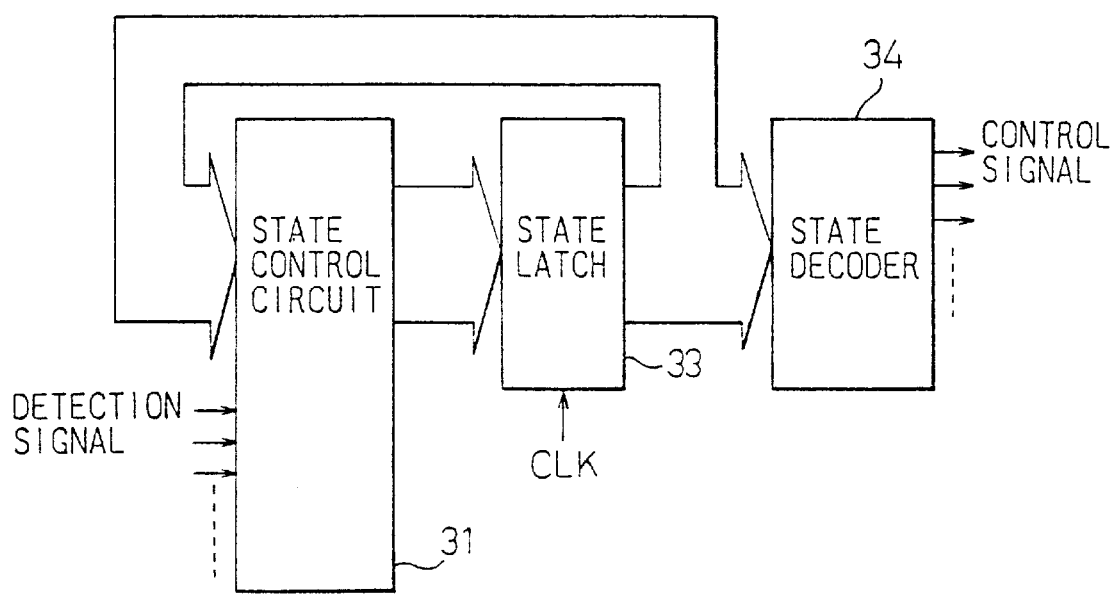
FIG. 2 shows the configuration of a conventional state machine.

FIG. 2 shows the configuration of a conventional state machine.

In FIG. 2, reference numeral 31 denotes a state control circuit. 32 denotes a state latch. 34 denotes a state decoder. The state machine is referred to as a decoder type state machine. The state latch 33 is designed to store only a small number of bits but can supply numerous control signals. Because of this, the state machine needs the state decoder 34.

The state latch 33 stores data representing a state at that time instant. An output of the state latch 33 is decoded by the state decoder 34 and supplied as a control signal to the state machine and other circuit elements. The control signal is also supplied to the state control circuit 31. The state control circuit 31 produces data representing a subsequent state according to the data representing the state at that time instant and a detection signal, and supplies the resultant data to the state latch 33. The state latch 33 latches the data synchronously with a state transition clock CLK. In other words, when a detection signal instructing a transition from one state to another is received, states are changed synchronously with the leading or trailing edge of the CLK.

Figure 3:
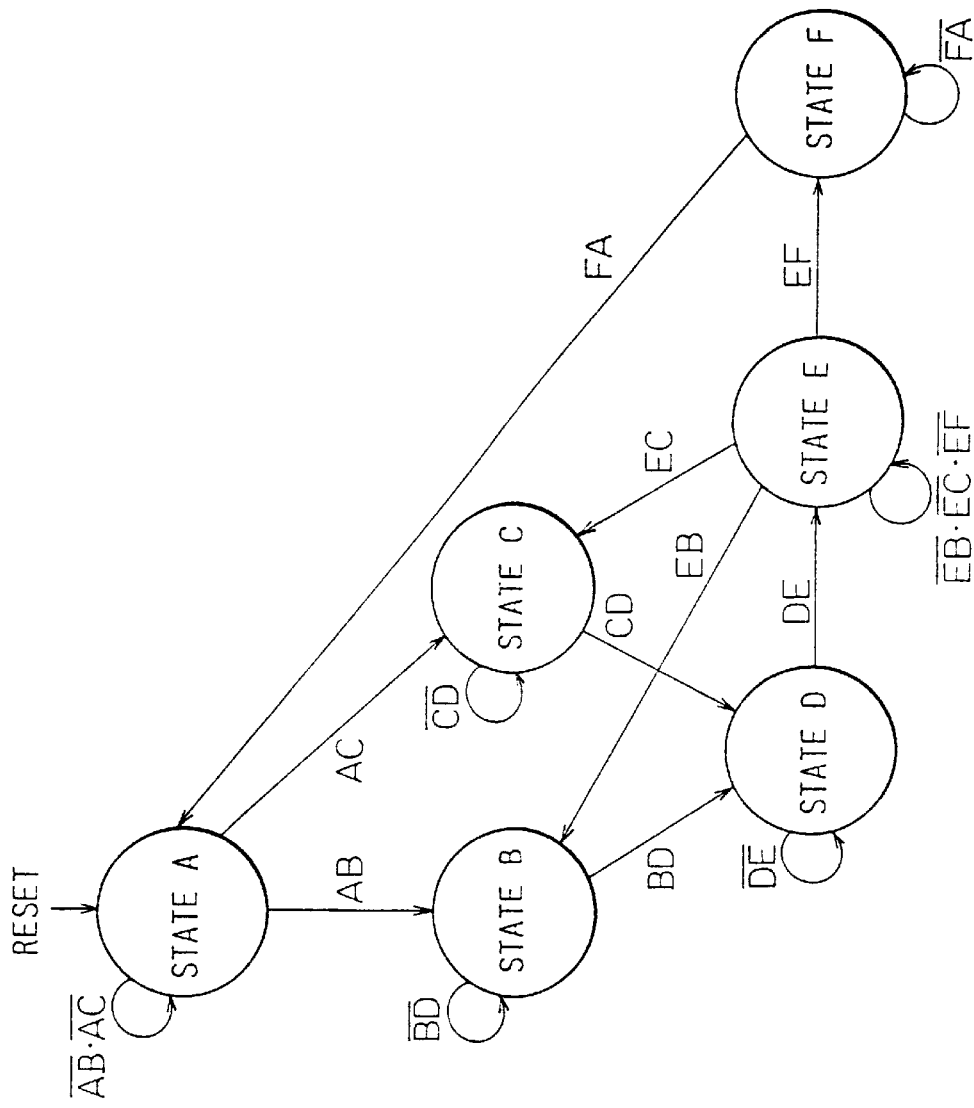
FIG. 3 shows an example of a state transition diagram concerning the conventional state machine.

FIG. 3 shows an example of a state transition diagram concerning the state machine.

Figure 4:
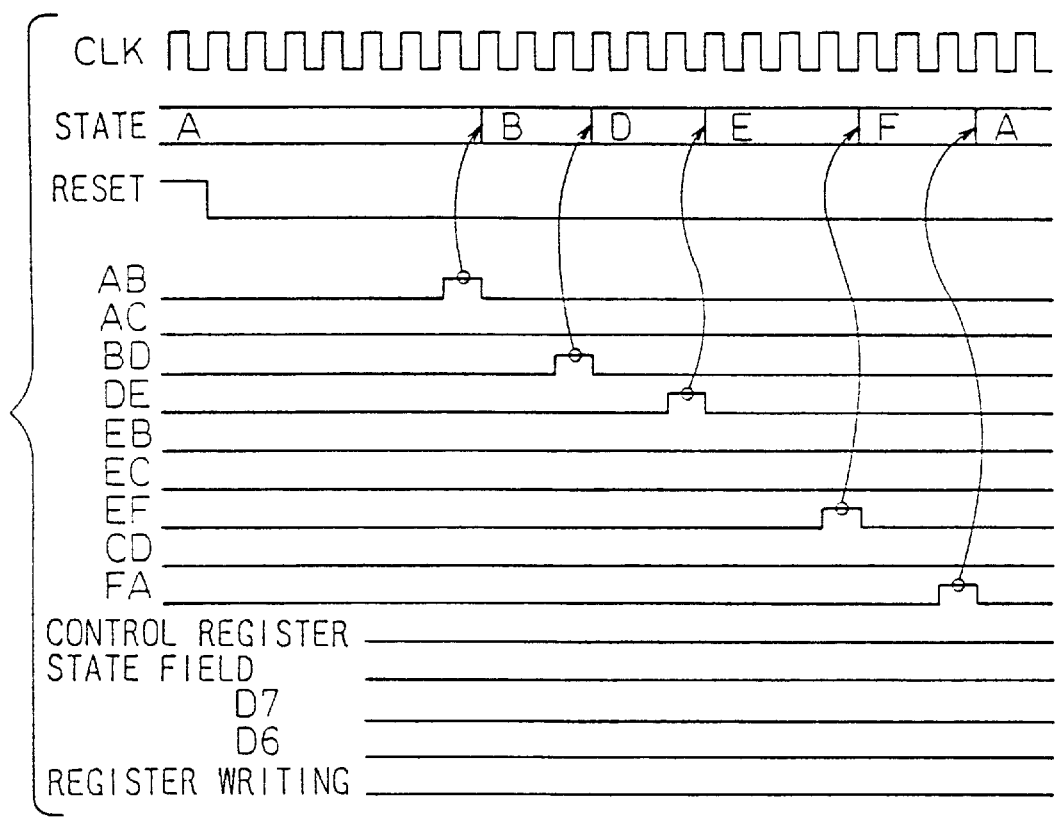
FIG. 4 shows a state transition timing chart concerning the conventional state machine.

As shown in FIG. 3, when the state machine is reset, it enters a state A. When conditions AB for a transition are met, a transition is made to a state B. When conditions AC for a transition are met, a transition is made to a state C. In the state B, when conditions BD for a transition are met, a transition is made to a state D. Thus, when given conditions are met in a certain state, a transition is made to another state. When another conditions are met in the state, a transition is made to yet another state. In short, transitions are made to any of states A to F. The timing chart of FIG. 4 shows the state transitions.

As described previously, a radio-frequency band usable in a cell defined under the cellular concept is divided into a plurality of narrower frequency bands. A portable terminal uses one of the frequency bands to transfer control data or voice and information. The data path used for data transfer includes a searching BCCH channel, a control channel, and a communication channel. The frequency differs from channel to channel. For ensuring continuous communication during moving, a base station that is communicating speech is switched to another one. Accordingly, frequencies are switched. State transitions made by the state machine in this case will be described in detail on the assumption that the state transitions are made in a mobile station according to the layer 1 protocol set forth in the Vehicle-mounted Digital Mobile Phone System Standards (RCR STD-27B) (hereinafter referred to as the RCR Standards).

Figure 5:
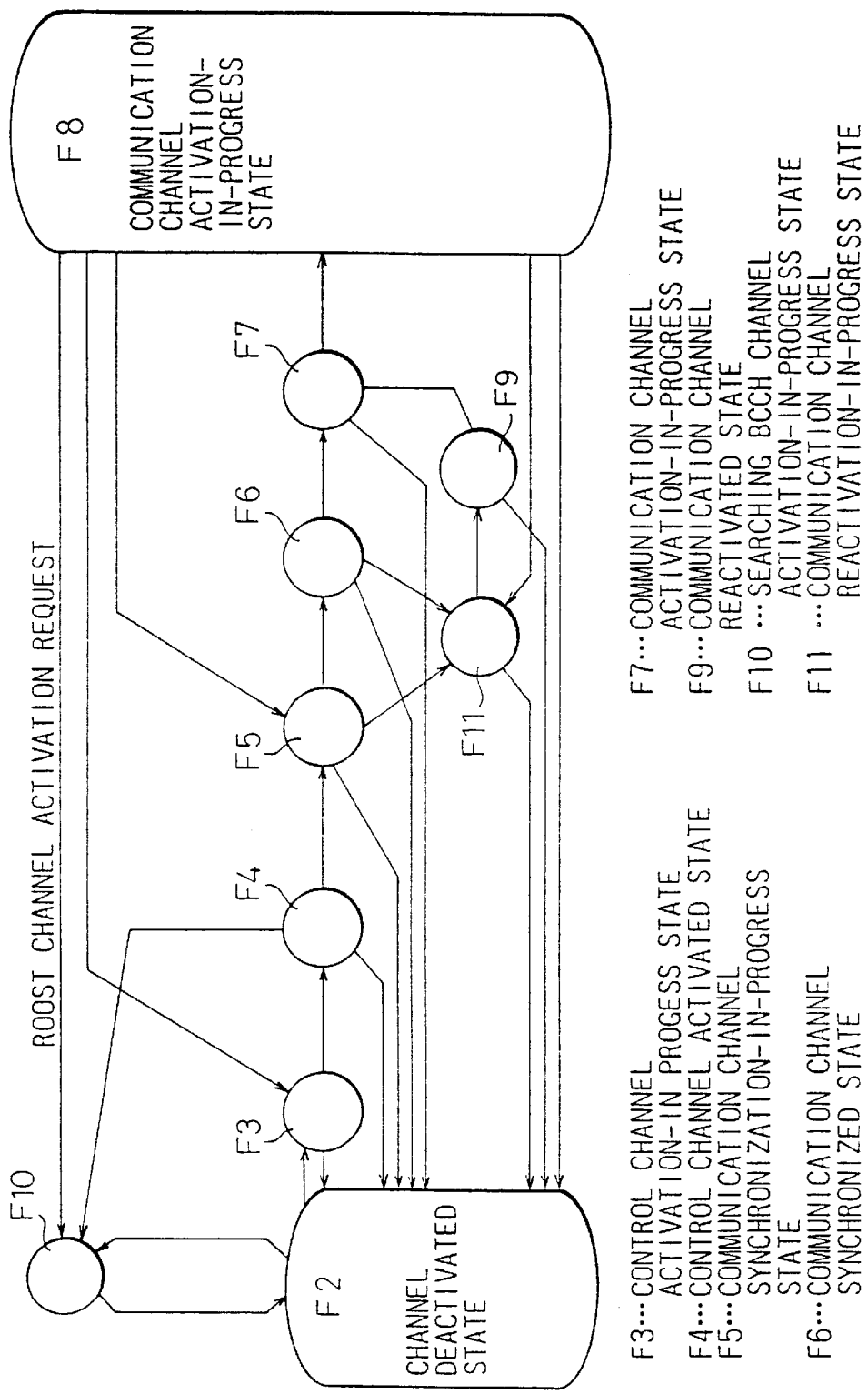
FIG. 5 shows a state transition diagram concerning a conventional communication control state machine.

According to the RCR Standards, a mobile station can assume states F1 to F11. FIG. 5 shows the state transitions. In FIG. 5, for a transition from a channel deactivated state F2 to a state in which a searching BCCH channel is activated, the CPU specifies a frequency associated with the searching BCCH channel in the LSI serving as the PLL. When the CPU recognizes that the PLL is locked to the frequency, the CPU issues a searching BCCH channel activation request. A transition is made to a state F10. For determining whether the PLL is locked to a certain frequency, the CPU can adopt a procedure of checking a timer in the LSI serving as the PLL to see if the lock detection time has come or a procedure of checking if a lock detection signal is sent from the LSI serving as the PLL via an input/output port. When frequencies are switched in a communication channel activation-in-progress state F8, if a transition is made to a communication channel synchronization-in-progress state F5, frequencies are switched by the LSI serving as the PLL in the communication channel activation-in-progress state. When the CPU detects a locked state, a transition is made to the communication channel synchronization-in-progress state F5. During frequency switching, while this sequence is under way, the state F8 is retained. Since the state F8 is a state in which no frequency is fixed, the state F8 cannot be retained as the state in layer 1. Therefore, during frequency switching, the CPU masks the state F8. For the masking, when a frequency is specified in the LSI serving as the PLL, a layer 1 state signal is kept masked until the CPU locks the PLL to a certain frequency. The same applies to a transition from the state F8 to F3, from the state F8 to F10, from the state F4 to F5, or from the state F4 to F10.

For constructing the terminal shown in FIG. 1, each of the state machine 17, receiver 18, transmitter 19, and PLL 20 are usually realized with a single LSI. Alternatively, the state machine 17, receiver 18, and transmitter 19 may be constructed using a single LSI.

For testing an LSI realizing the state machine 17 or an LSI realizing the state machine 17, receiver 18, and transmitter 19 alike, the state machine need not always be tested in all the states the state machine can assume. Whether the state machine operates normally can be checked by testing it in a specific state. However, when a state machine makes state transitions as shown in FIG. 3, if it should be tested in the state F, it must be reset to the state A. Thereafter, state transitions are made consecutively in order to retain the state F. In other words, a state machine cannot be placed in a desired state until it satisfies the conditions for the preceding states. In a state machine that makes state transitions as shown in FIG. 3, when the state machine is requested to enter the state F, transitions must be made from the state A through the states B, D, and E to the state F or transitions must be made from the state A through the states C, D, and E to the state F. For a state machine that makes more complex state transitions, it takes much time for the state machine to enter a desired state. This leads to a degraded use efficiency of a tester and an increased test cost.

Figure 6:
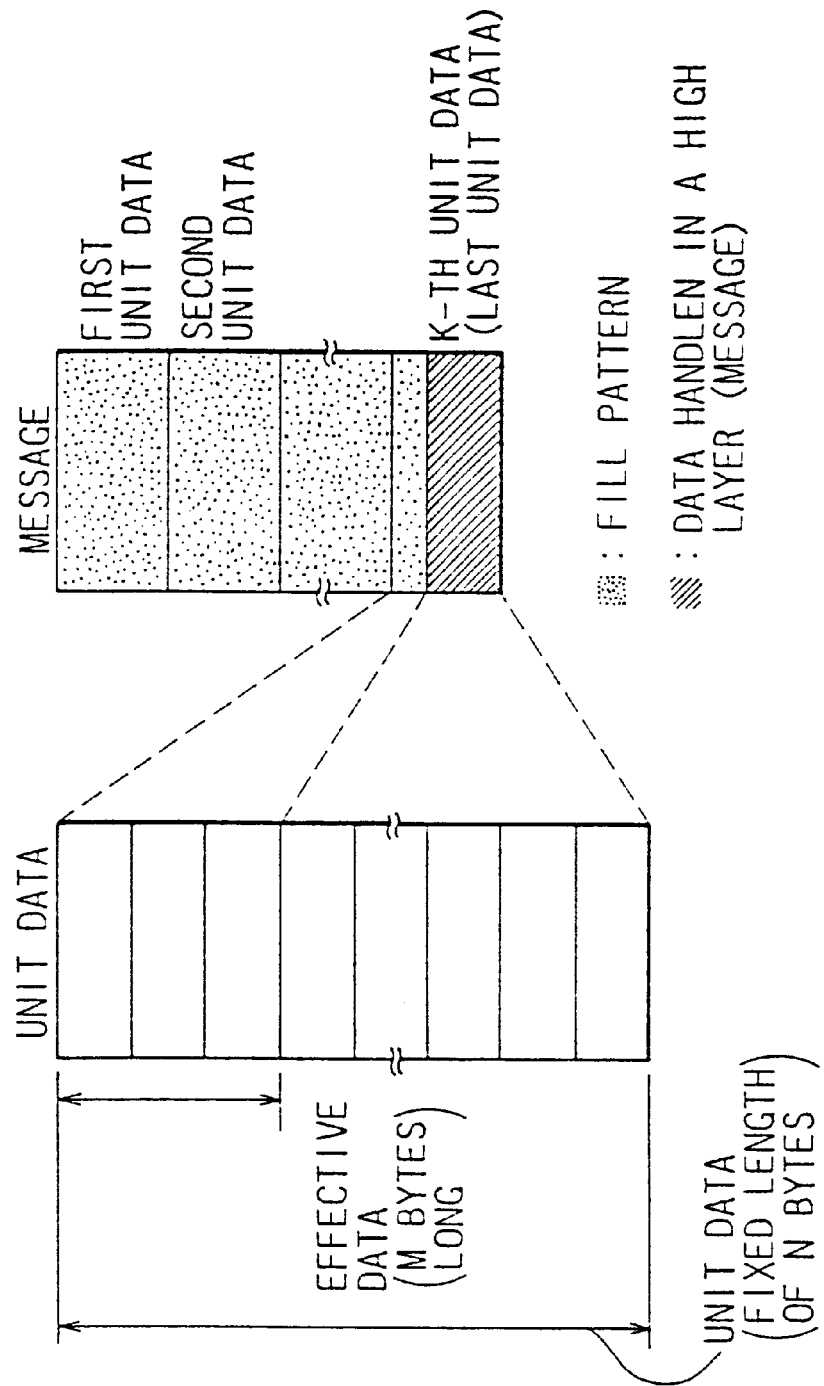
FIG. 6 shows an example of a data structure of block data to be communicated.

State transitions to be made by a state machine have been described so far. Next, a sequence to be processed by the transmitter 19 will be described briefly. As described previously, as far as the TDMA method is concerned, data transfer is achieved in units of block data that is data having a length of a given number of bytes. FIG. 6 shows a standard data structure of block data. In general, block data to be handled at a lower level (for example, a physical layer) of transfer described in a protocol includes control data concerning a high layer of transfer described in the protocol and a message. However, data to be handled in a higher layer of transfer described in a protocol may have a smaller data length than block data such as the K-th block data. A standard protocol stipulates that when no effective data is handled in the higher layer of transfer described in the protocol, block data should be padded with a specific fill pattern (for example, 0s).

Figure 7:
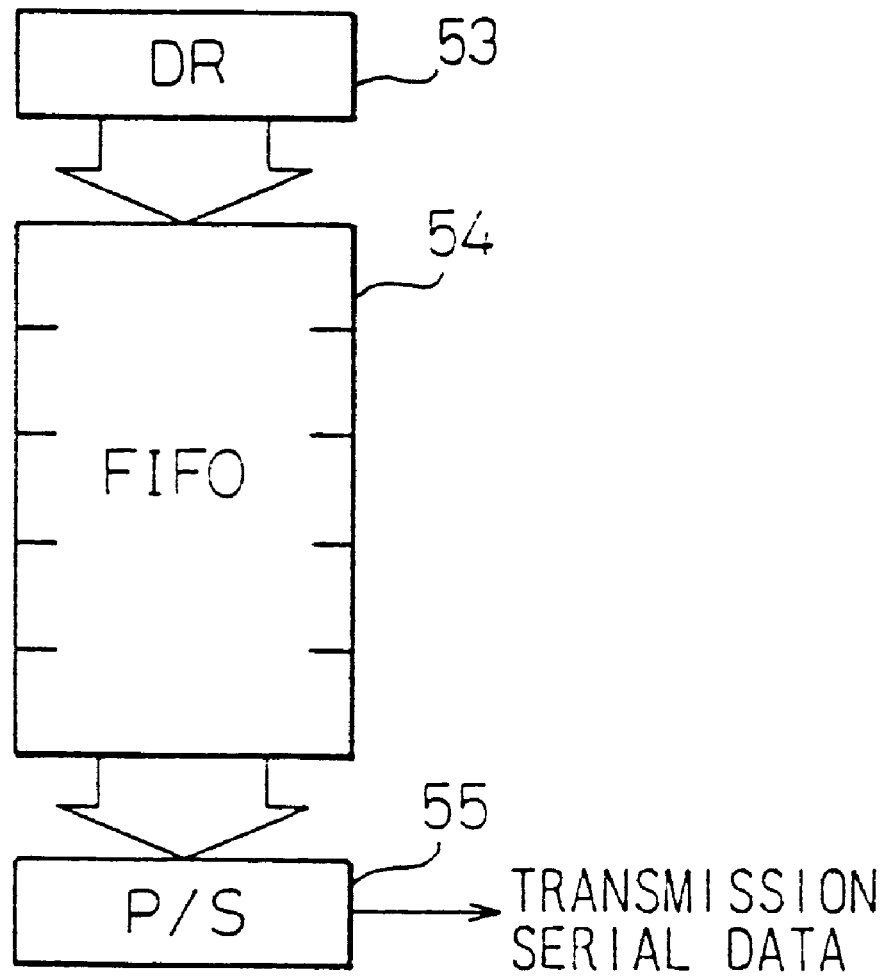
FIG. 7 shows the configuration of a conventional transmitter.

FIG. 7 shows the fundamental configuration of a conventional transmitter.

In FIG. 7, reference numeral 53 denotes a data register (DR) in which transmission data and a fill pattern are written. 54 denotes a first-in-first-out (hereinafter FIFO) buffer serving as a transmission buffer. 55 denotes a parallel-serial converter for converting parallel data supplied from the FIFO buffer 54 into serial transmission data.

Figure 8:
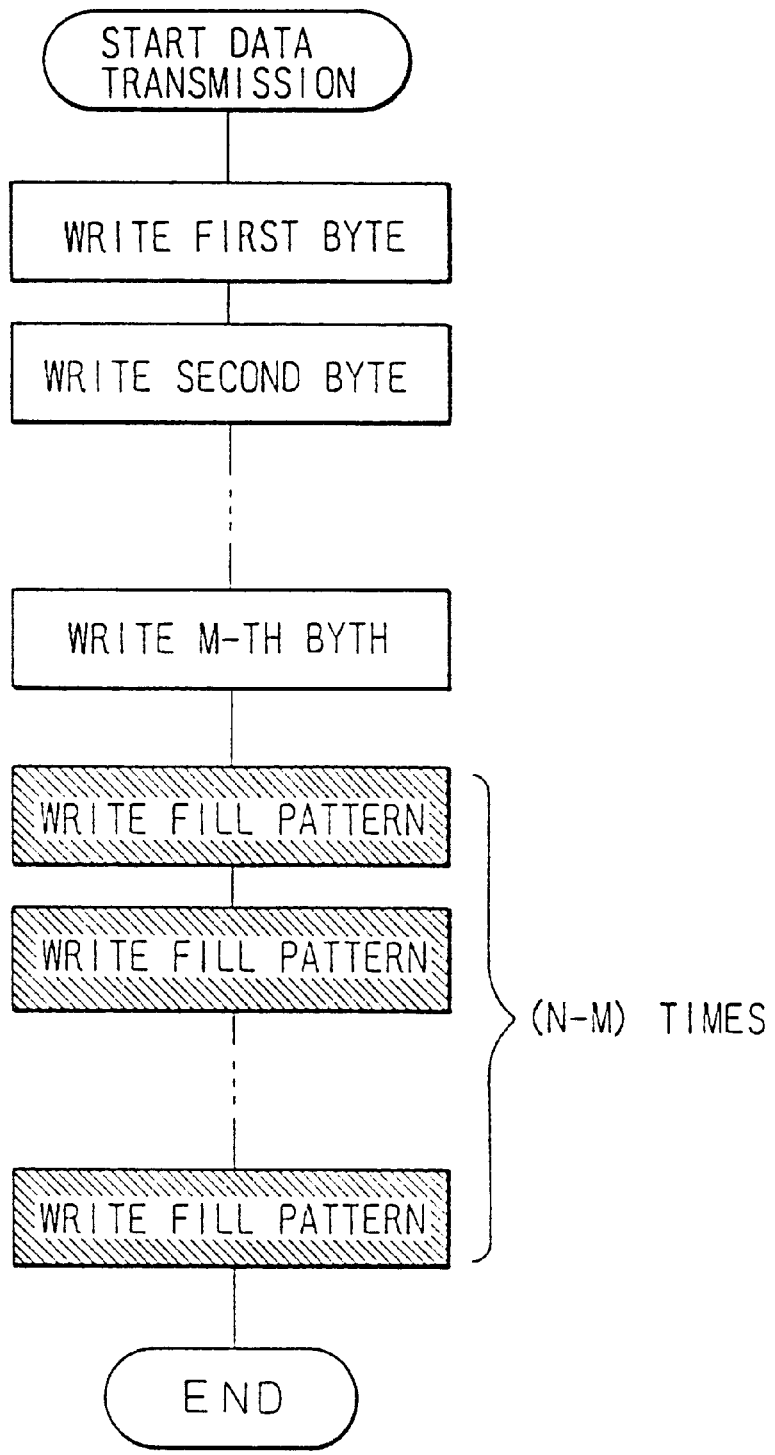
FIG. 8 is a flowchart describing data writing to be performed according to a conventional method.

In the circuitry shown in FIG. 7, only the data written in the data register 53 is used to construct a data unit to be transmitted. The microcomputer 1 must therefore write transmission data (effective data and a fill pattern) having a fixed data length (N bytes) in the transmission buffer 54 in the transmitter 19 during every transmission. For transmitting a message composed of block data shown in FIG. 6, the microcomputer 1 writes effective data of M bytes long and a fill pattern, (N-M) bytes long, in the data register as the K-th block data that is the last block data according to the procedure described in the flowchart of FIG. 8.

As mentioned above, in a communication terminal, a microcomputer determines whether a PLL is locked to a certain frequency during frequency setting and masks a state machine until the PLL is locked to a certain frequency as a result of frequency switching. The microcomputer must therefore bear a heavy load. This results in a decreased processing speed. When a microcomputer offering superb processing ability is used in an effort to solve the problem, cost increases.

Likewise, in a conventional transmitter for transmitting block data, a microcomputer writes a fill pattern in a data register. The microcomputer must therefore bear a heavy load. This leads to the above problem.

The conventional state machine and communication terminal have been described so far. Embodiments of the present invention will be described below.

Figure 9:
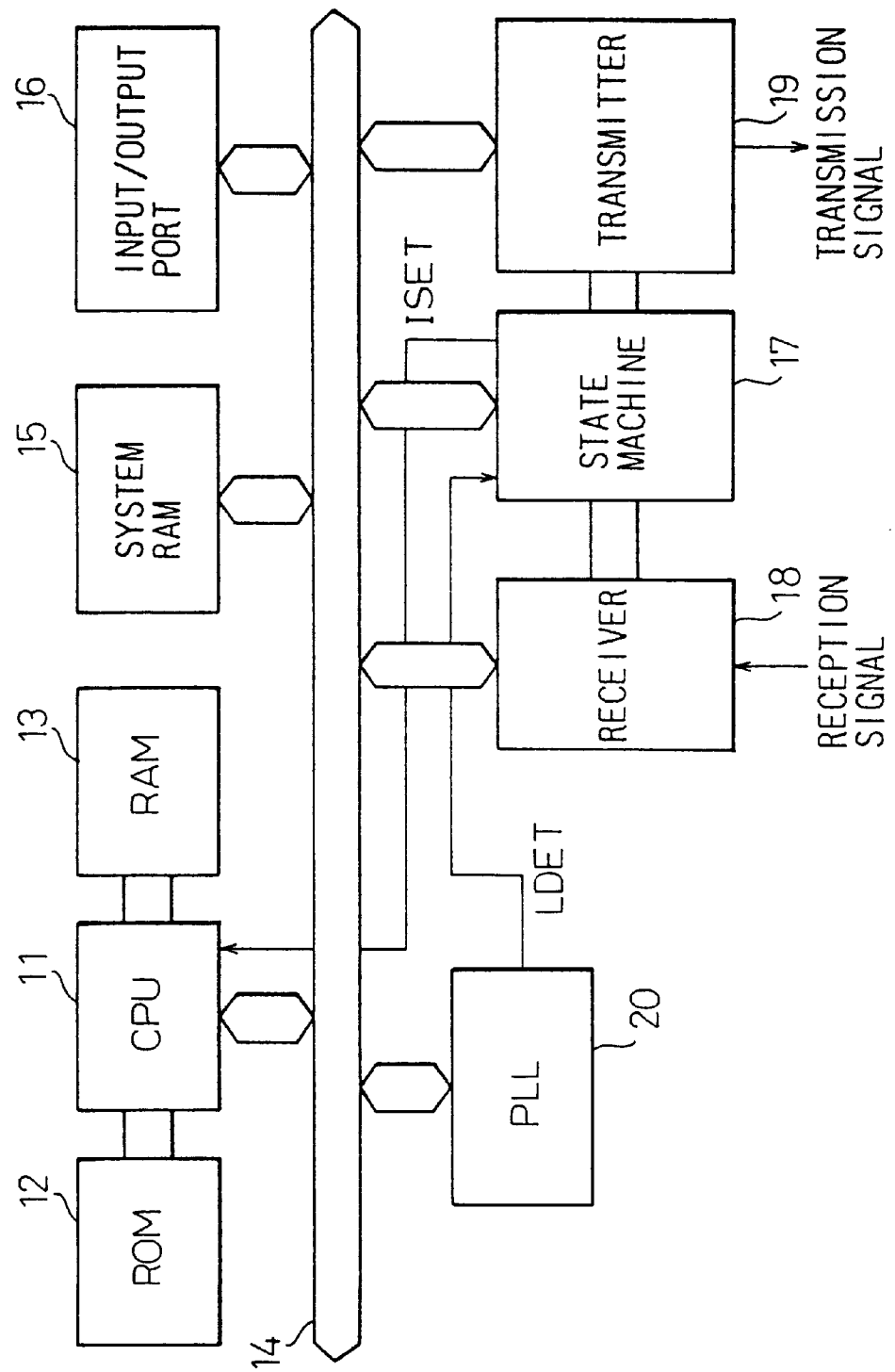
FIG. 9 shows the overall configuration of an embodiment in accordance with the present invention.

FIG. 9 shows the overall configuration of a portable communication terminal in which the first to third embodiments of the present invention to be described below are implemented.

In FIG. 9, reference numeral 11 denotes a CPU. 12 denotes a ROM. 13 denotes a RAM. 14 denotes a system bus. 15 denotes a system RAM. 16 denotes an input/output port. These elements constitute a microcomputer. 17 denotes a state machine. 18 denotes a receiver. 19 denotes a transmitter. 20 denotes a PLL for generating a clock used for communication. Within a communication system accommodating the terminal, a frequency band allotted to this system is divided into narrower frequency bands which are associated with respective channels. The channels are switched according to the type of data to be transferred or the base station of a communication destination.

Every time channels are switched, the PLL 20 must change the frequency of a clock to be produced. When it is said that the PLL changes the frequency of a clock, this means that the microcomputer accesses a register in the PLL 20 and changes the contents of the register. It takes some time for the PLL to lock into a given frequency after the contents of the register are changed. Conventionally, a microcomputer determines that the PLL is locked to a frequency, and then issues an activation request to a state machine. Thus, the microcomputer is engaged in the sequence. For determining whether the PLL is locked to a frequency, whether a lock detection signal is sent from the PLL 20 is monitored via the input/output port 16. Alternatively, a time interval, which is longer than time required until the PLL is locked to a given frequency after the contents of register is modified, is set. When the time interval is counted down, it is considered that the PLL is locked to the given frequency. Thereafter, subsequent steps are processed. Anyhow, it is the microcomputer which carries out the entire sequence. While channels are being switched, a communication link is disconnected. The time required to switch channels must be as short as possible. During channel switching, the microcomputer must monitor the presence of a lock detection signal or the count of a timer consistently but cannot execute any other processing.

The overall configuration of a portable communication terminal in which the embodiments of the present invention are implemented have been described. The embodiments will be described below.

Figure 10:
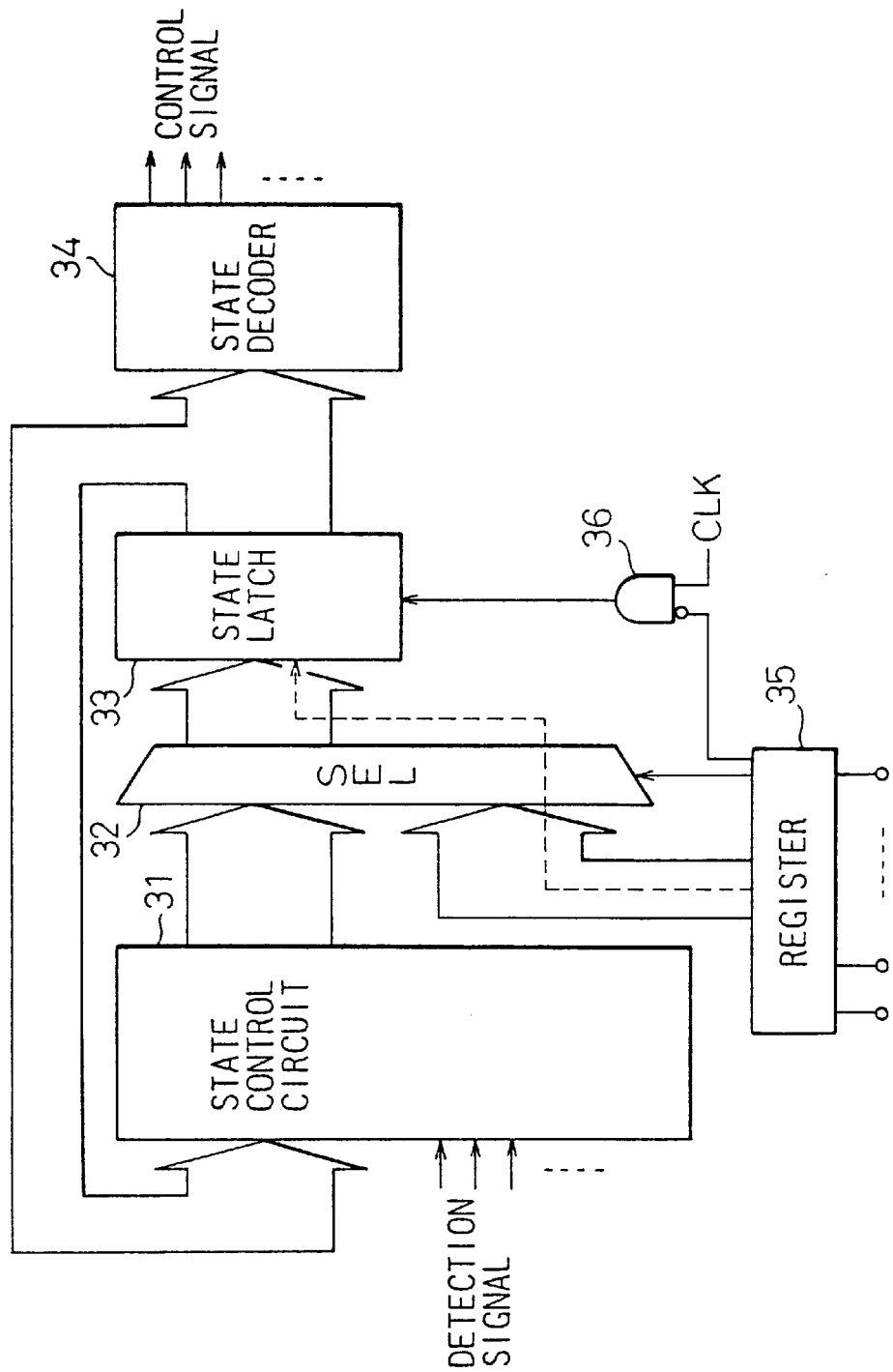
FIG. 10 is a block diagram showing the circuitry of a state machine in the first embodiment of the present invention.

In the first embodiment, the first aspect of the present invention is adapted to the state machine shown in FIG. 9. FIG. 10 is a block diagram showing the state machine.

In FIG. 10, reference numeral 31 denotes a state control circuit. 33 denotes a state latch. 34 denotes a state decoder. These elements are identical to the conventional ones shown in FIG. 2. As apparent from comparison with FIG. 2, FIG. 10 shows a register 35, a selector (SEL) 32, and an AND gate 36 which are newly added. The selector 32 selects data provided by the state control circuit 31 or data of six bits long supplied from the register 35 according to a one-bit signal supplied from the register 35.

Figures 11A, 11B:
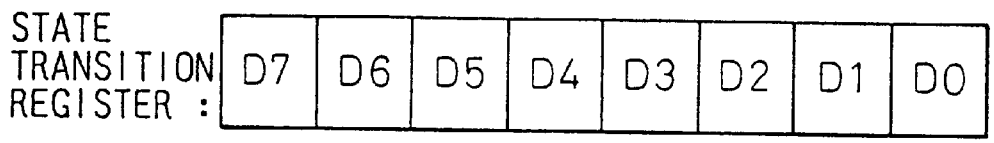
FIG. 11A shows the bit assignment of a state transition input register in the first embodiment.
FIG. 11B shows the meanings of the bits residing in the state transition input register.

FIGS. 11A and 11B show the bit assignment of the register 35 and the meanings of the bits respectively.

As shown in FIG. 11A, the register 35 is eight bits long. As shown in FIG. 11B, the most significant bit D7 is a state transition mode bit. D6 denotes a state transition retention mode bit. D5 to D0 denote state transition code bits. For normal operation, the bit D7 is set to 0. For specifying any of state codes indicated by the bits D5 to D0 in the register 35, the bit D7 is set to 1. When the bit D7 represents a 0, the selector 32 selects data provided by the state control circuit 31. The state machine then changes states according to the state at that time instant and a detection signal. When the bit D7 represents a 1, a code indicated by the bits D5 to D0 in the register 35 is selected. The state machine is placed in the state represented by the code indicated by the bits D5 to D0.

As mentioned above, the state machine includes the state decoder 34. The state decoder 34 is of the type that decodes data representing a state and produces a signal representing the state. The bits D5 to D0 in the register 35 act as state transition code bits. A total of 64 states can be specified. The number of states actually assumed by the state machine need not be equal to the total. The number of states that can be specified in the register 35 should be larger than the number of states actually assumed by the state machine.

A clock CLK and an inverted signal of the state transition retention mode bit D6 are fed to the AND gate 36. The output of the AND gate 36 is fed as a clock to the state latch 33. When the bit D6 represents a 0, the clock CLK is fed to the state latch 33. The state machine operates normally. When the bit D6 represents a 1, no clock is fed to the state latch 33. Latched data is retained as it is. When the bit D6 represents a 0, a normal operation mode is set up. When the bit D6 represents a 1, any state is retained.

Figure 12:
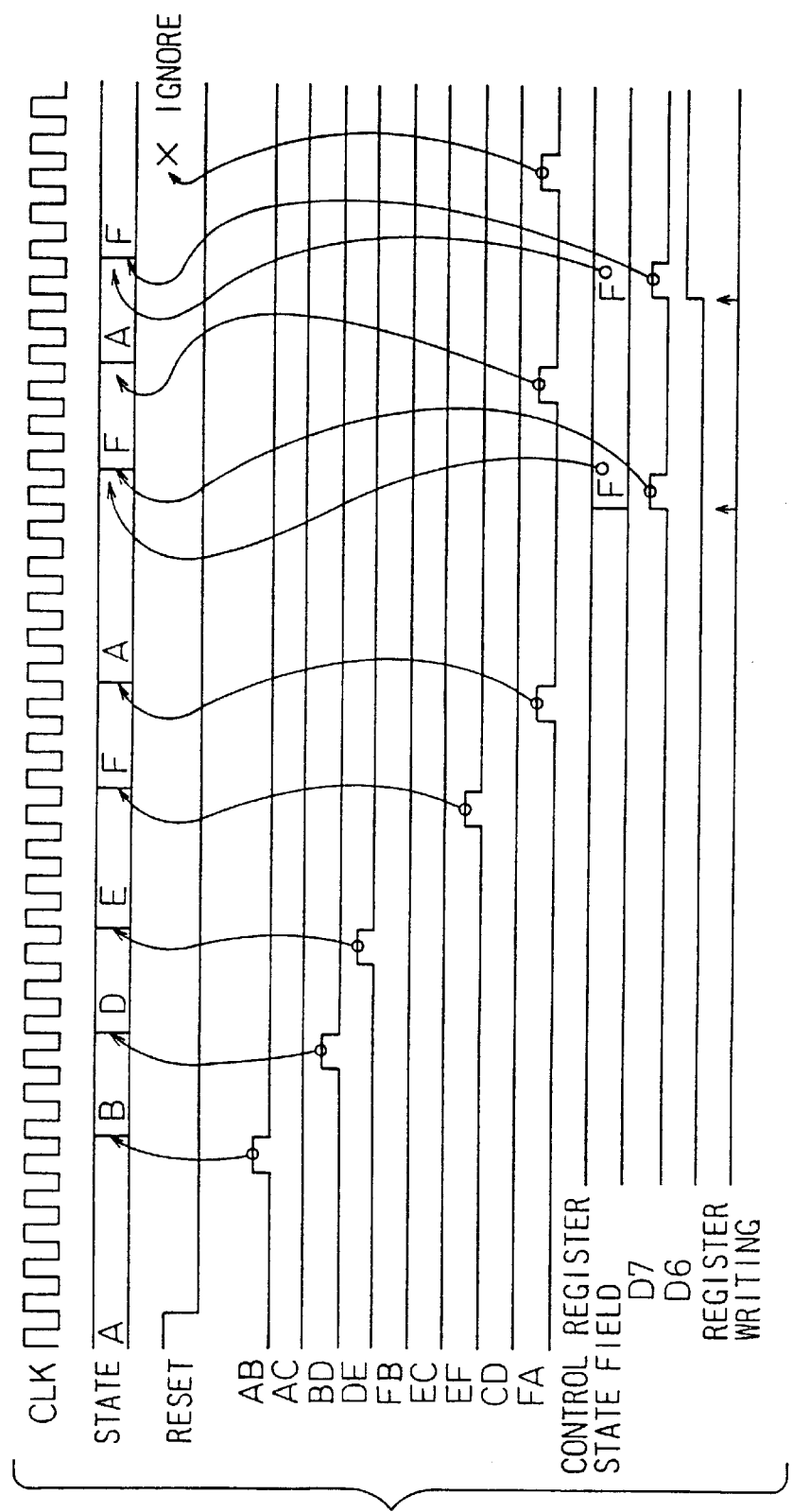
FIG. 12 is a state transition timing chart concerning the first embodiment.
Figure 15:
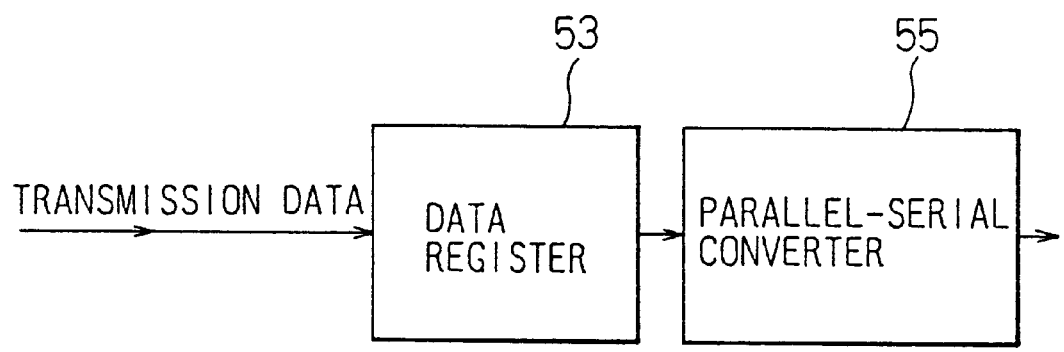
FIG. 15 shows the fundamental configuration of a transmitter in the third embodiment of the present invention.

FIG. 12 is a timing chart describing state transitions to be made on the assumption that the state machine in the first embodiment makes state transitions as shown in FIG. 15.

As shown in FIG. 12, when the state machine is reset, a state A is set up. When the bits D7 and D6 represent 0s, if conditions for a transition are met, a state transition is made. In the state A, when the state transition code bits D5 to D0 are set to 000101 representing a state F, if the bit D7 is set to 1, the state machine is placed in the state F responsively to the subsequent rise of the clock CLK. In this state, when the bit D7 is reset to 0, if conditions FA are met, a transition is made to the state A. When the state transition code bits D5 to D0 are set to, for example, 000101 representing the state F, even if the bit D7 is set to 1, as long as the bit D6 represents a 1, the state A is retained.

In case a state is designated externally, the bit D6 of the register 35 and the AND gate 36 become unnecessary. By contrast, when data need not be stored, the selector 32 as well as the bits D7 and D5 to D0 of the register 35 are unnecessary.

The second embodiment of the present invention is a portable communication terminal having the overall configuration shown in FIG. 9. The difference from a conventional terminal lies in that a lock detection signal LDET is supplied from the PLL 20 to the state machine 17 and a frequency setting request signal ISET is supplied as an interrupt from the state machine 17 to the CPU 11.

Figure 13:
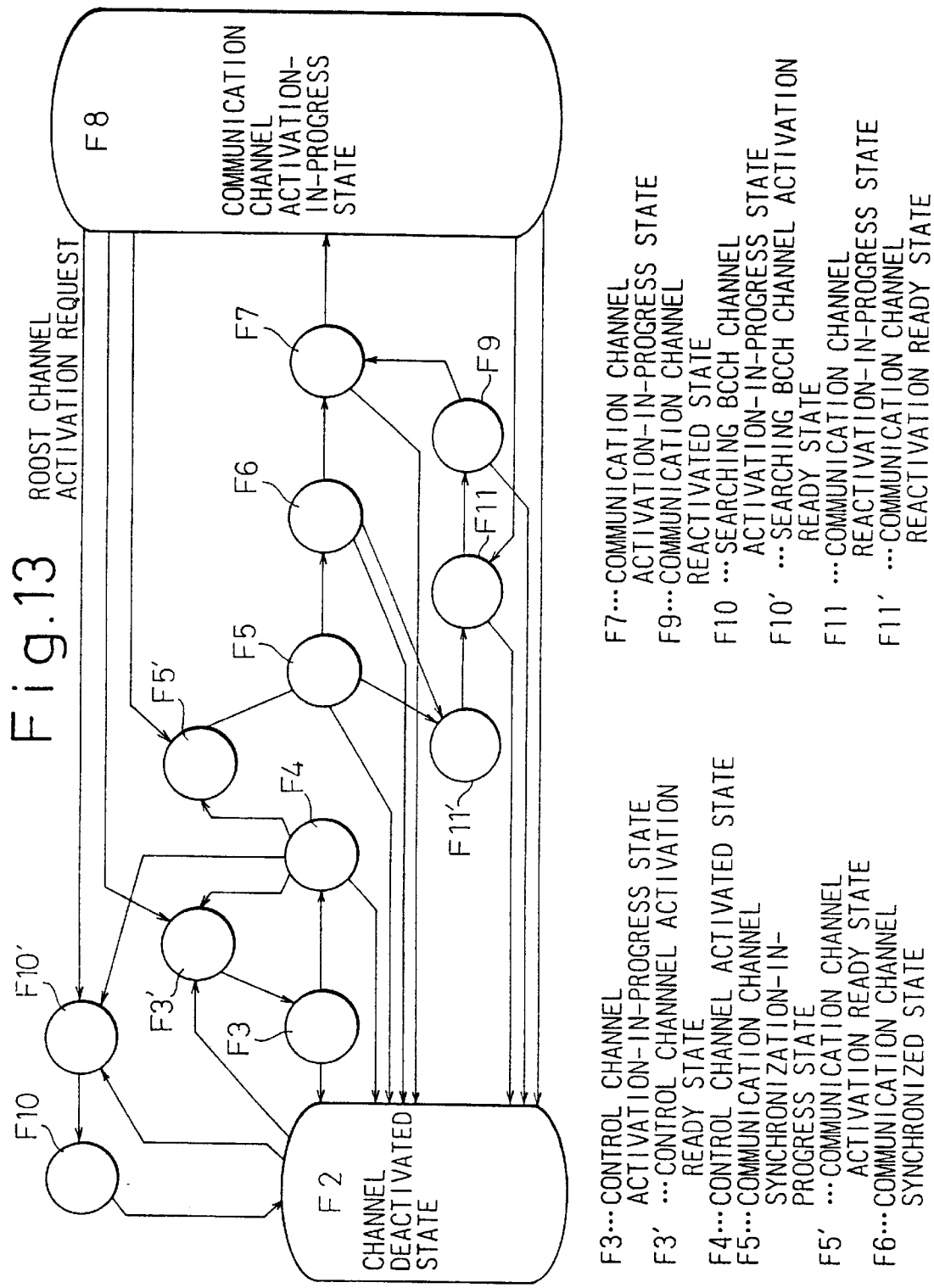
FIG. 13 is a state transition diagram concerning the second embodiment of the present invention.

FIG. 13 is a state transition diagram concerning the state machine 17 in the terminal of the second embodiment. The state transition diagram corresponds to the one of FIG. 5 and depicts state transitions defined to be made in layer 1 of the RCR Standards. As is apparent from a comparison between the two diagrams, the difference between the second embodiment and the prior art lies in that a searching BCCH channel activation ready state F10' in which frequencies are switched, a control channel activation ready state F3', a communication channel activation ready state F5', and a communication channel reactivation ready state F11' are newly added.

Figure 14:
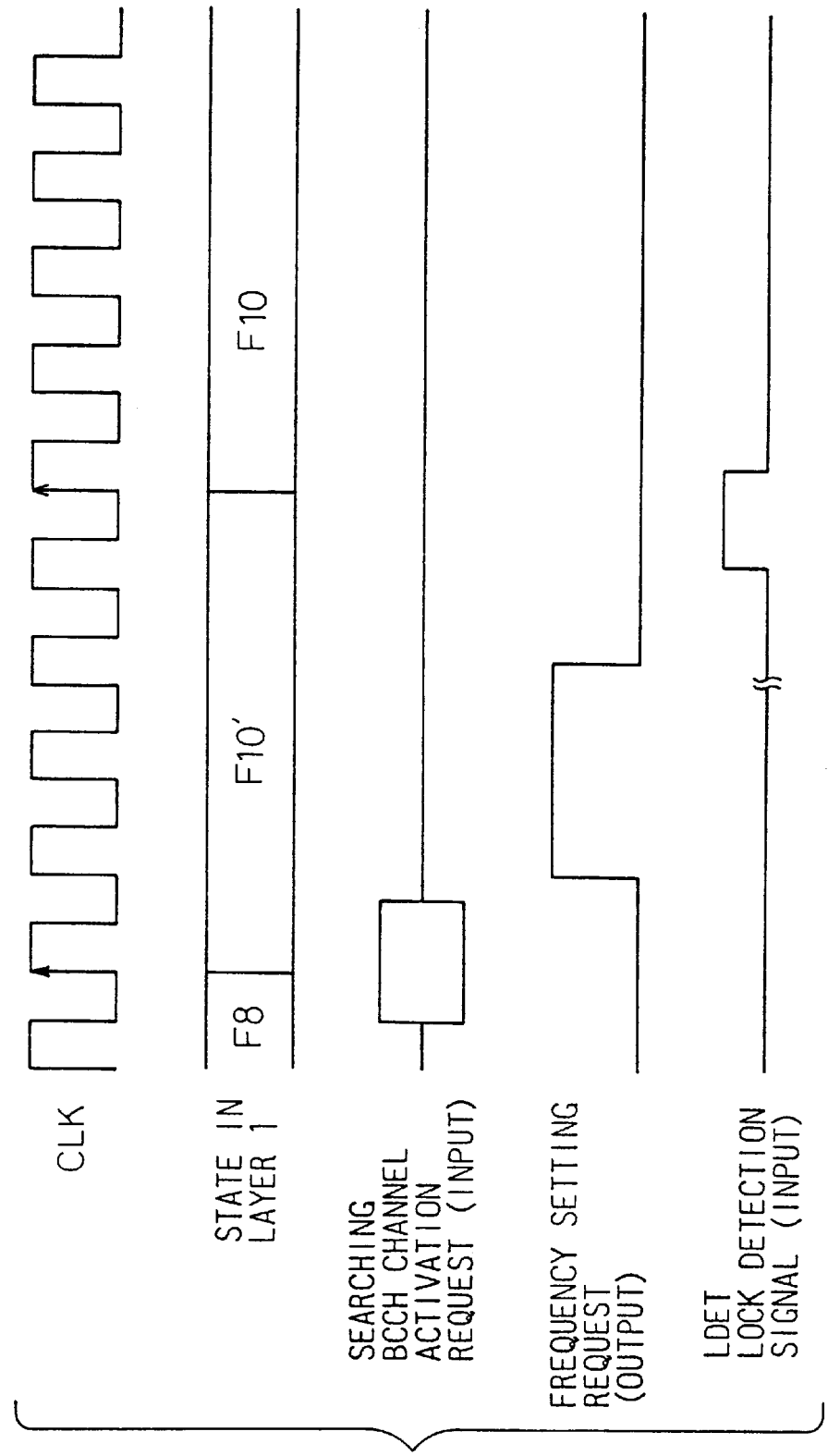
FIG. 14 is a state transition timing chart concerning the second embodiment.

FIG. 14 is a timing chart describing state transitions made in the second embodiment. Referring to the drawing, a sequence to be performed in the second embodiment will be described below.

In a conventional terminal, when a channel is activated or channels are switched, the CPU 11 determines if the channel is activated or an intended frequency is locked, and issues a channel activation request. By contrast, in this embodiment, when it is required to activate a channel or switch channels, the CPU issues a channel activation request. When a frequency setting request ISET is posted as an interrupt to the CPU 11, the CPU 11 specifies a frequency in the PLL 20. When the CPU 11 issues the channel activation request, the state machine 17 makes a transition to an activation ready state. For example, when a searching BCCH channel activation request is issued from the CPU 11 in a communication channel activation-in-progress state F8, a transition is made to a searching BCCH channel activation ready state F10'. With this transition, it becomes unnecessary to mask a frequency switching ready state in the instant of escaping from the state F8. This results in reliable handshaking between the CPU 11 and the state machine 17 for controlling layer 1 of transfer. When receiving a lock detection signal LDET from the PLL 20 in the activation ready state, the state machine 17 automatically makes a transition to a subsequent state.

As mentioned above, the CPU need not mask a state in which frequencies are switched or determine whether the PLL is locked to a frequency. When a request is issued during channel activation or channel switching, a request for specifying a frequency in the PLL is issued as an interrupt to the CPU. In response to the interrupt, the CPU specifies a frequency in the PLL. This eliminates a time loss occurring when a timer is monitored in order to determine whether a conventional PLL is locked to a frequency and also eliminates a load which a CPU incurs in monitoring the presence of a lock detection signal. Furthermore, the CPU can control firmware straightforwardly.

FIG. 15 shows the fundamental configuration of the transmitter 19 shown in FIG. 9 in which the third aspect of the present invention is implemented and which is regarded as the third embodiment.

In FIG. 15, reference numeral 53 denotes a data register for temporarily storing data to be transmitted. 55 denotes a parallel-serial converter for converting data stored in the data register 53 into serial data usable for communication. The CPU 11 accesses the transmitter 19 to store data in bytes. A fill pattern is therefore one byte long. The data register stores data in units of one byte. The parallel-serial converter 55 converts eight-bit data into one-bit serial data. Block data is eight bytes long. The data register 53 has a storage capacity of eight bytes so as to store data in units of eight bytes. When transmission data sent from the CPU 11 has been written in the data register, a writing end signal DL is supplied. Hereafter, all bits acting as a fill pattern shall represent 0s.

Figure 16:
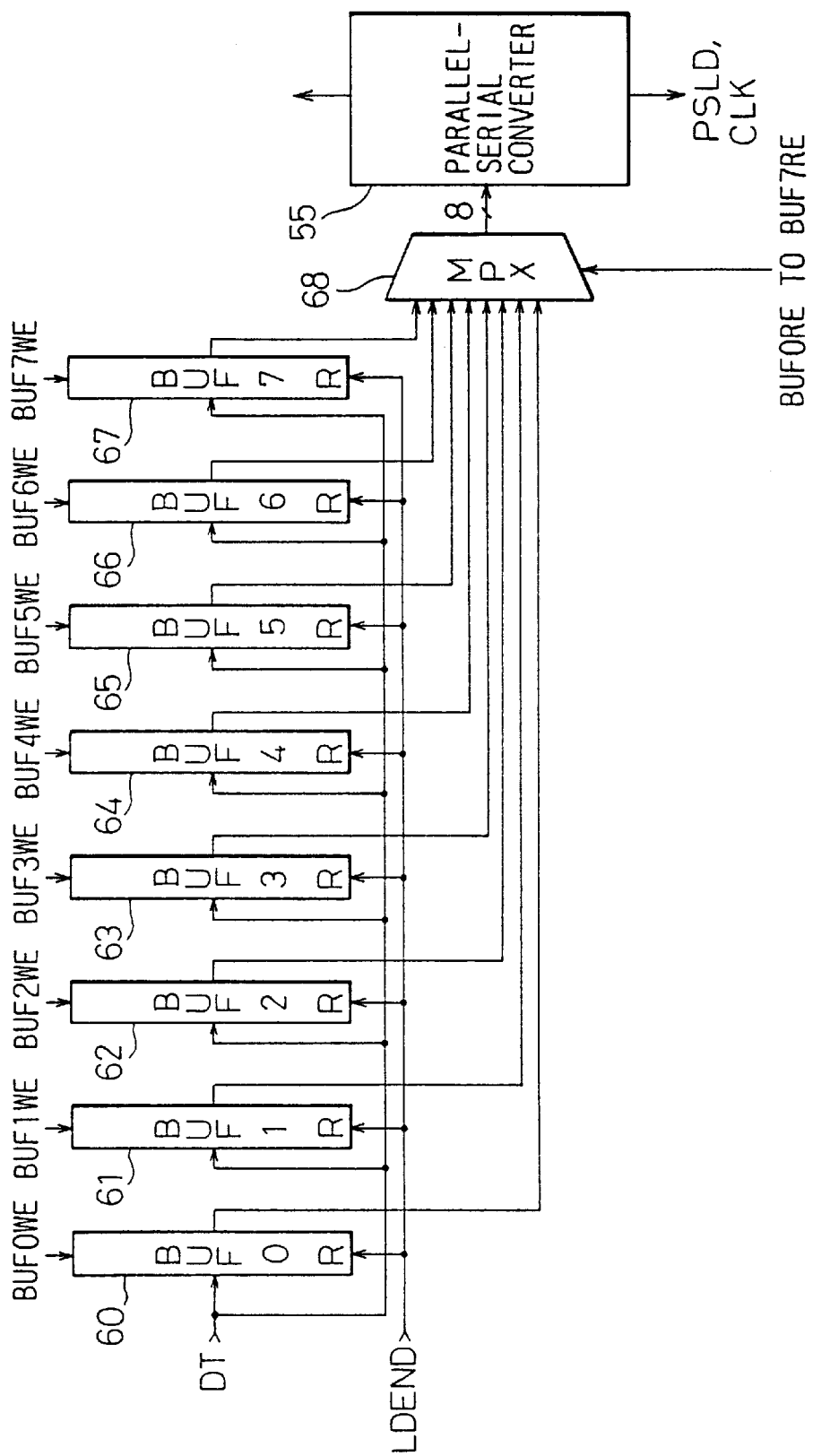
FIG. 16 shows data buffers and a parallel-serial converter in the third embodiment.
Figure 17:
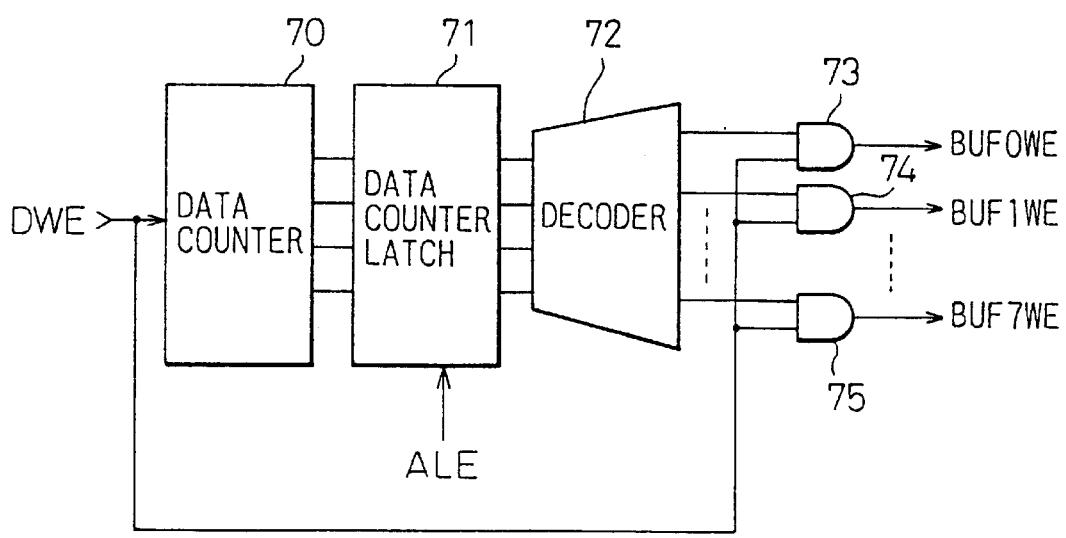
FIG. 17 shows circuitry for generating signals shown in FIG. 16.

FIG. 16 shows an example of an arrangement of input data buffers constituting part of the data register 53. Herein, block data is eight bytes long. The input data buffers offer a capacity of eight bytes. Each of the eight data buffers BUF0, BUF1, etc., and BUF7 is one byte long. The circuitry shown in FIG. 17 produces write enable signals BUF0WE, BUF1WE, etc., and BUF7WE for the respective data buffers. Every time one byte is written, the CPU transmits a write enable signal DWE. A data counter 70 counts signals. Every time writing is performed, a count is incremented. A data counter latch 71 latches the count. A decoder 72 decodes the count. Consequently, a bit position representing a 1 shifts sequentially. The output of the decoder 72 and the signal DWE are fed to each of AND gates 73, 74, etc., and 75, and ANDed therein. The AND gates provide outputs BUF0WE, BUF1WE, etc., and BUF7WE. After the first writing, the output BUF0WE represents a 1. Next, the BUF1WE represents a 1. Thus, the outputs of the AND gates represent 1s alternately at every completion of writing.

Input data DT is stored in data buffers starting with the BUF0 in the order in which the input data DT is fed. When transmission data is smaller than block data 8 bytes long, some data buffers may not be written. Every time writing and transmission of block data are completed, each data buffer is initialized. All the bits residing in each data buffer are set to 0. The bits residing in a data buffer in which no transmission data is written remain 0s. The bits representing 0s act as a fill pattern.

Data written in a data buffer is supplied to the parallel-serial converter 55. A multiplexer (MPX) 68 in FIG. 16 is a circuit for selecting data to be fed to the parallel-serial converter 55 from among data stored in the data buffers BUF0, BUF1, etc., and BUF7. Depending on which of read enable signals BUF0RE, BUF1RE, etc., and BUF7RE is supplied, any of the data stored in the data buffers is selected as an output.

Each data buffer has a capacity of eight bits. When the eighth communication clock CK is counted, data in a data buffer is converted into serial data. With every eight clocks CK, read enable signals must be changed in order to change data buffers to be read. A signal PSLD causing the parallel-serial converter 55 to latch read data must be fed to the parallel-serial converter 55.

Figure 18:
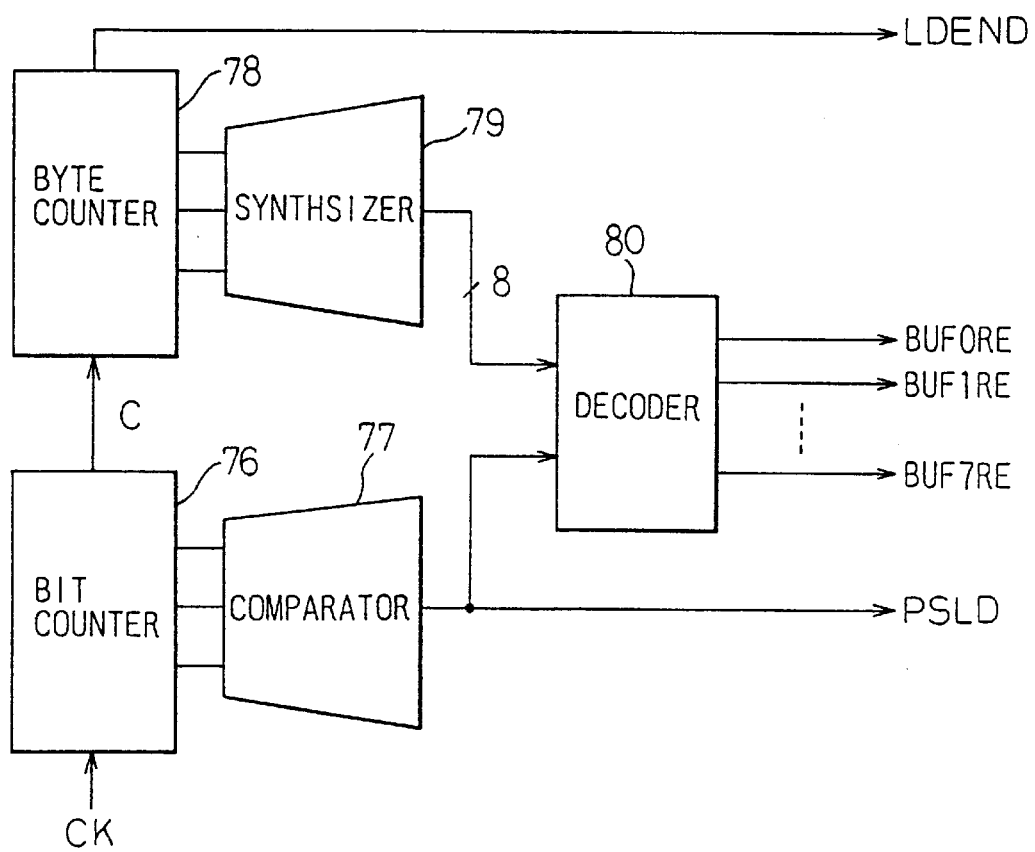
FIG. 18 shows another example of circuitry for generating signals shown in FIG. 16.

FIG. 18 shows the circuitry for producing the signals BUF0RE, BUF1RE, etc., and BUF7RE, and PSLD as well as a signal LDEND instructing initialization of each data buffer.

In FIG. 18, a bit counter 76 is a counter for counting clocks CK associated with eight bits residing in each data buffer. When a comparator 77 determines that the bit counter 76 has counted eight clocks, the signal PSLD is supplied. When the counting of eight clocks is completed, the bit counter 76 generates a carry C. A byte counter 78 counts the carries C. The byte counter 78 indicates a data buffer number to be read. A decoder 79 decodes the number. The decoded data and signal PSLD are ANDed by a synthesizer 80. This results in signals BUF0RE, BUF1RE, etc., and BUF7RE. When counting the eighth carry, the byte counter 78 generates the signal LDEND. With the signal LDEND, the bits residing in each data buffer are reset to 0.

Figure 19:
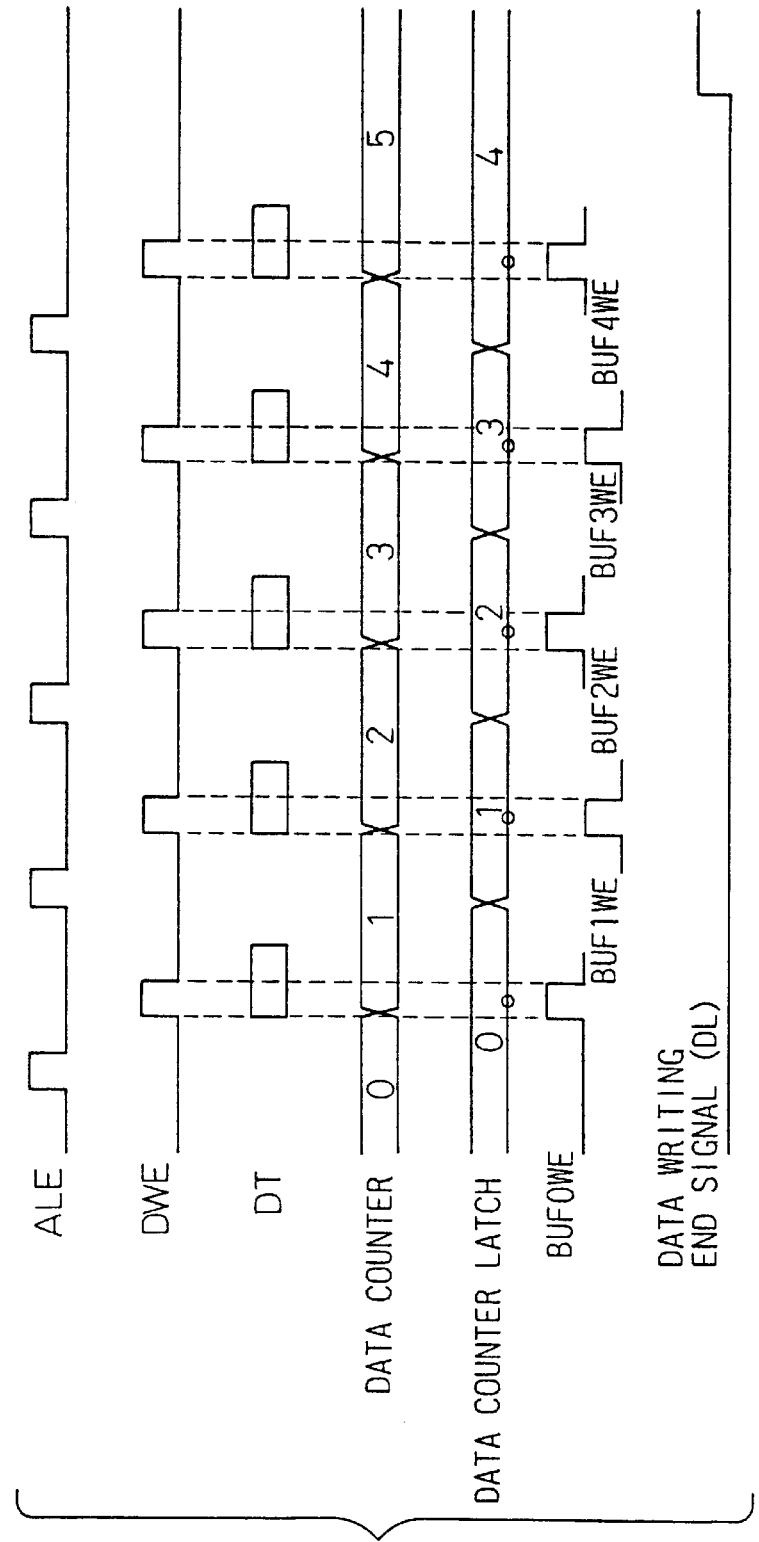
FIG. 19 is a timing chart describing writing of data in the data buffers in the third embodiment.

FIGS. 19 and 20 are timing charts concerning the third embodiment on the assumption that each of eight data buffers is one byte long, block data to be transmitted is eight bytes long, and data to be actually transmitted is only five bytes long. FIG. 19 is a timing chart describing writing, while FIG. 20 is a timing chart describing transmission.

For writing, the data buffers BUF0 to BUF7 are initialized. As shown in FIG. 19, five sets of a write enable signal DWE and writing data are supplied from the CPU. The data is stored in the data buffers BUF0 to BUF4. The bits residing in the data buffers BUF5 to BUF7 into which no data is written remain 0s. With the input of a data writing end signal DL, transmission is started.

During transmission, as shown in FIG. 20, data representing eight bits in a data buffer is latched by the parallel-serial converter 55 in response to the signal PSLD, and then converted into serial data synchronously with the clock CK. When conversion of the data representing eight bits in a data buffer is completed, data in a subsequent data buffer is converted into serial data. This procedure is repeated eight times in order to handle eight data buffers. Thus, a fill pattern is automatically stored in any of the data buffers BUF5 to BUF7 in which no data is written.

The transmitter of the third embodiment has been described so far. For brevity's sake, the description has proceeded on the assumption that transmission is started after writing of data buffers is completed. In general, a FIFO buffer shown in FIG. 7 is employed. Therefore, the instant writing of a data buffer is started, data transmission is started. FIFO buffers can be realized by adding a control circuit enabling a FIFO operation to the circuitry shown in FIGS. 16 to 18. The FIFO buffer has been widely adopted in the past. The FIFO buffer itself has no direct relation to the present invention. No further mention will therefore be made of the FIFO buffer.

As mentioned above, a fill pattern is produced within a transmitter. The CPU 11 is therefore released from the work of producing or transferring a fill pattern. Thus, the load on the CPU is lightened. Furthermore, since the use of a data bus for data transfer is reduced, the performance of a whole system improves. This enables use of an inexpensive CPU having little processing ability or use of a CPU that employs a low-frequency clock and consumes little power.

As described above, according to the present invention, a state machine that can be tested easily is realized and the load to a microcomputer in a communication terminal is lightened.

What is claimed is:

1. A transmitter operable in a communication mode in which block data having a fixed data length is used for communication and a blank area in said block data is padded with a given fill pattern, comprising:

a data register for temporarily storing transmission data; and a parallel-serial converter for converting transmission data stored in said data register into serial data;

said data register always being initialized by hardware to have a value corresponding to said given fill pattern before data is fed to said data register; and data stored in said data register is entirely output to said parallel-serial converter.

2. A transmitter according to claim 1, wherein said data register includes a plurality of data buffers, the bit length of each data buffer corresponds to a unit of data length by which said data register is accessed, and all of said plurality of data buffers are initialized by hardware before data is fed to said data register.

* * * * *